United States Patent
Ishikawa (10) Patent No.: US 9,028,992 B2
(45) Date of Patent: May 12, 2015

(54) FUEL CELL SYSTEM (75) Inventor: Norimasa Ishikawa, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1079 days.

(21) Appl. No.: 12/527,107

(22) PCT Filed: Feb. 7, 2008

(86) PCT No.: PCT/JP2008/052481
§ 371 (c)(1),
(2), (4) Date: Nov. 23, 2009

(87) PCT Pub. No.: WO2008/099905
PCT Pub. Date: Aug. 21, 2008

(65) Prior Publication Data
US 2010/0098980 A1    Apr. 22, 2010

(30) Foreign Application Priority Data

Feb. 14, 2007 (JP) .................................. 2007-034048

(51) Int. Cl.
*H01M 8/04* (2006.01)
(52) U.S. Cl.
CPC ...... *H01M 8/04089* (2013.01); *H01M 8/04231* (2013.01); *Y02E 60/50* (2013.01)
(58) Field of Classification Search
CPC ..................... H01M 8/04089; H01M 8/04231; H01M 8/04388; H01M 8/0466; Y02E 60/50
USPC .................................. 429/428–432, 443, 444
See application file for complete search history.

(56) References Cited

U.S. PATENT DOCUMENTS

| 6,815,108 | B2* | 11/2004 | Ueda et al. ................. 429/429 |
| 2004/0067399 | A1* | 4/2004 | Kobayashi et al. ............. 429/25 |
| 2004/0185316 | A1* | 9/2004 | Wells et al. .................... 429/22 |
| 2005/0164049 | A1* | 7/2005 | Cipollini ........................ 429/13 |
| 2005/0214604 | A1* | 9/2005 | Goto et al. ..................... 429/22 |
| 2005/0258385 | A1* | 11/2005 | Miller et al. ............. 251/129.21 |
| 2006/0035120 | A1* | 2/2006 | Sakai .............................. 429/22 |
| 2006/0051632 | A1* | 3/2006 | Kamihara ....................... 429/22 |
| 2008/0026271 | A1* | 1/2008 | Ueda et al. ..................... 429/23 |
| 2009/0233132 | A1* | 9/2009 | Hasuka et al. ................. 429/25 |

FOREIGN PATENT DOCUMENTS

| JP | 8-200143 A | 8/1996 |
| JP | 08-200143 A | 8/1996 |
| JP | 2003-308868 A | 10/2003 |
| JP | 2004-179114 A | 6/2004 |

(Continued)

OTHER PUBLICATIONS

International Search Report, PCT/JP2008/052481, May 13, 2008.

*Primary Examiner* — Carlos Barcena
(74) *Attorney, Agent, or Firm* — Kenyon & Kenyon LLP (57) ABSTRACT

Disclosed is a fuel cell system including a fuel cell, a fuel supply passage through which a fuel gas supplied from a fuel supply source flows to the fuel cell, an on/off valve which regulates the state of the gas on the upstream side of the fuel supply passage to supply the gas to the downstream side thereof, a sensor which detects the state of the gas in the fuel supply passage, and control means for controlling the on/off valve based on a value detected by the sensor. The control means stops the opening/closing operation of the on/off valve when the sensor falls into an abnormal state.

10 Claims, 6 Drawing Sheets

(56) References Cited

FOREIGN PATENT DOCUMENTS

| JP | 2005-302563 A | 10/2005 | | |
| JP | 2007-172888 A | 7/2007 | | |
| JP | 2007-286031 A | 11/2007 | | |
| JP | 2008-77955 A | 4/2008 | | |
| WO | WO 2006006672 A1 | * | 1/2006 | .............. H01M 8/04 |

* cited by examiner

FUEL CELL SYSTEM

This is a 371 national phase application of PCT/JP2008/052481 filed 7 Feb. 2008, which claims priority to Japanese Patent Application No. 2007-034048 filed 14 Feb. 2007, the contents of which are incorporated herein by reference.

TECHNICAL FIELD

The present invention relates to a fuel cell system.

BACKGROUND ART

Heretofore, a fuel cell system including a fuel cell for receiving a supplied reactant gas (a fuel gas and an oxidizing gas) to generate a power has been suggested and put to practical use. In general, such a fuel cell system is provided with a fuel supply passage through which the fuel gas supplied from a fuel supply source such as a hydrogen tank flows to the fuel cell, and the fuel supply passage is provided with a pressure regulation valve (a regulator) which decreases the pressure of the fuel gas to be supplied from the fuel supply source to a constant value.

At present, a technology has been suggested in which an on/off valve for changing the supply pressure of the fuel gas is provided in the fuel supply passage, to change the supply pressure of the fuel gas in accordance with the operation state of the system. Moreover, in recent years, a technology has also been suggested in which a pressure sensor is disposed on the upstream side of the on/off valve, to control the on/off valve based on a value detected by the pressure sensor (e.g., see Japanese Patent Application Laid-Open No. 2005-302563). When the technology disclosed in this Patent Document is employed, the breakdown of the on/off valve can be judged.

DISCLOSURE OF THE INVENTION

However, even in a case where the technology disclosed in Japanese Patent Application Laid-Open No. 2005-302563 is employed, when a pressure sensor falls into an abnormal state owing to disconnection, short circuit or the like, the breakdown of the on/off valve cannot be judged, and the on/off valve cannot normally be controlled. When such a situation occurs, owing to the wrong operation of the on/off valve, the amount of a fuel gas to be supplied to a fuel cell immediately increases or decreases, and normal power generation might be disturbed.

The present invention has been developed in view of such a situation, and an object thereof is to suppress the abnormality of the power generation of a fuel cell caused by sensor abnormality in a fuel cell system having an on/off valve which changes the supply state of a fuel gas to the fuel cell, and a sensor which detects the state of the gas to control the on/off valve.

To achieve the object, the fuel cell system according to the present invention is a fuel cell system comprising: a fuel cell; a fuel supply passage through which a fuel gas supplied from a fuel supply source flows to the fuel cell; an on/off valve which regulates the state of the gas on the upstream side of the fuel supply passage to supply the gas to the downstream side thereof; a sensor which detects the state of the gas in the fuel supply passage; and control means for controlling the on/off valve based on a value detected by the sensor, wherein the control means stops the opening/closing operation of the on/off valve when the sensor falls into an abnormal state.

When such a constitution is employed, it is possible to prevent the supply state of the fuel gas to the fuel cell from being abnormal owing to the wrong operation of the on/off valve caused by the sensor abnormality. Therefore, it is possible to prevent the power generation state of the fuel cell from being abnormal, and it is also possible to avoid a situation in which constituent components in the fuel cell deteriorate owing to the immediate increase of the amount of a fuel to be supplied to the fuel cell. It is to be noted that "the state of the gas" is a gas state represented by a flow rate, pressure, temperature, molar concentration or the like, and more particularly the state includes at least one of the gas flow rate and the gas pressure.

In the fuel cell system, it is possible to employ the control means for judging that the sensor falls into the abnormal state in a case where the detected value of the sensor is below a predetermined lower limit value or above a predetermined upper limit value (or in a case where the detected value of the sensor is below the predetermined lower limit value or above the predetermined upper limit value and this state continues for a predetermined time).

Moreover, the fuel cell system further comprises a shut valve provided on the upstream side of the on/off valve and configured to shut the fuel gas supplied from the fuel supply source, and can employ the control means for closing the shut valve when the sensor falls into the abnormal state.

When such a constitution is employed, the shut valve on the upstream side of the on/off valve can be closed in accordance with the sensor abnormality, whereby the pressure of the fuel gas on the upstream side of the on/off valve can be prevented from excessively rising, and the breakdown of the on/off valve can be suppressed.

Moreover, the fuel cell system preferably employs the control means for restarting the opening/closing operation of the on/off valve when the sensor recovers from the abnormal state to a normal state.

When such a constitution is employed and the sensor recovers from the abnormal state to the normal state, the opening/closing operation of the on/off valve can automatically be restarted, to restart the supply of the fuel to the fuel cell. Therefore, when the sensor recovers from the abnormal state to the normal state, the power generation of the fuel cell can automatically be restarted.

Moreover, in the fuel cell system, it is possible to employ the control means for judging that the sensor recovers from the abnormal state to the normal state in a case where the detected value of the sensor judged to be abnormal is the predetermined lower limit value or more and the predetermined upper limit value or less (or in a case where the detected value of the sensor judged to be abnormal is the predetermined lower limit value or more and the predetermined upper limit value or less and this state continues for a predetermined time).

Furthermore, in the fuel cell system, an injector is employed as the on/off valve, and a pressure sensor which detects the pressure of the fuel gas on the downstream side of the injector can be employed as the sensor.

The injector is an electromagnetic driving type on/off valve in which a valve body is directly driven with an electromagnetic driving force for a predetermined drive cycle and detached from a valve seat, whereby the gas state (the gas flow rate or the gas pressure) can be regulated. A predetermined control section drives the valve body of the injector to control the jet timing or jet time of the fuel gas, whereby the flow rate or pressure of the fuel gas can be controlled.

According to the present invention, in the fuel cell system having the on/off valve which changes the supply state of the fuel gas to the fuel cell and the sensor which detects the gas state to control the on/off valve, it is possible to suppress the abnormality of the power generation of the fuel cell caused by the sensor abnormality.

BEST MODE FOR CARRYING OUT THE INVENTION

Hereinafter, a fuel cell system 1 according to an embodiment of the present invention will be described with reference to the drawings. In the present embodiment, an example will be described in which the present invention is applied to a car-mounted power generation system of a fuel cell vehicle.

Figure 1:
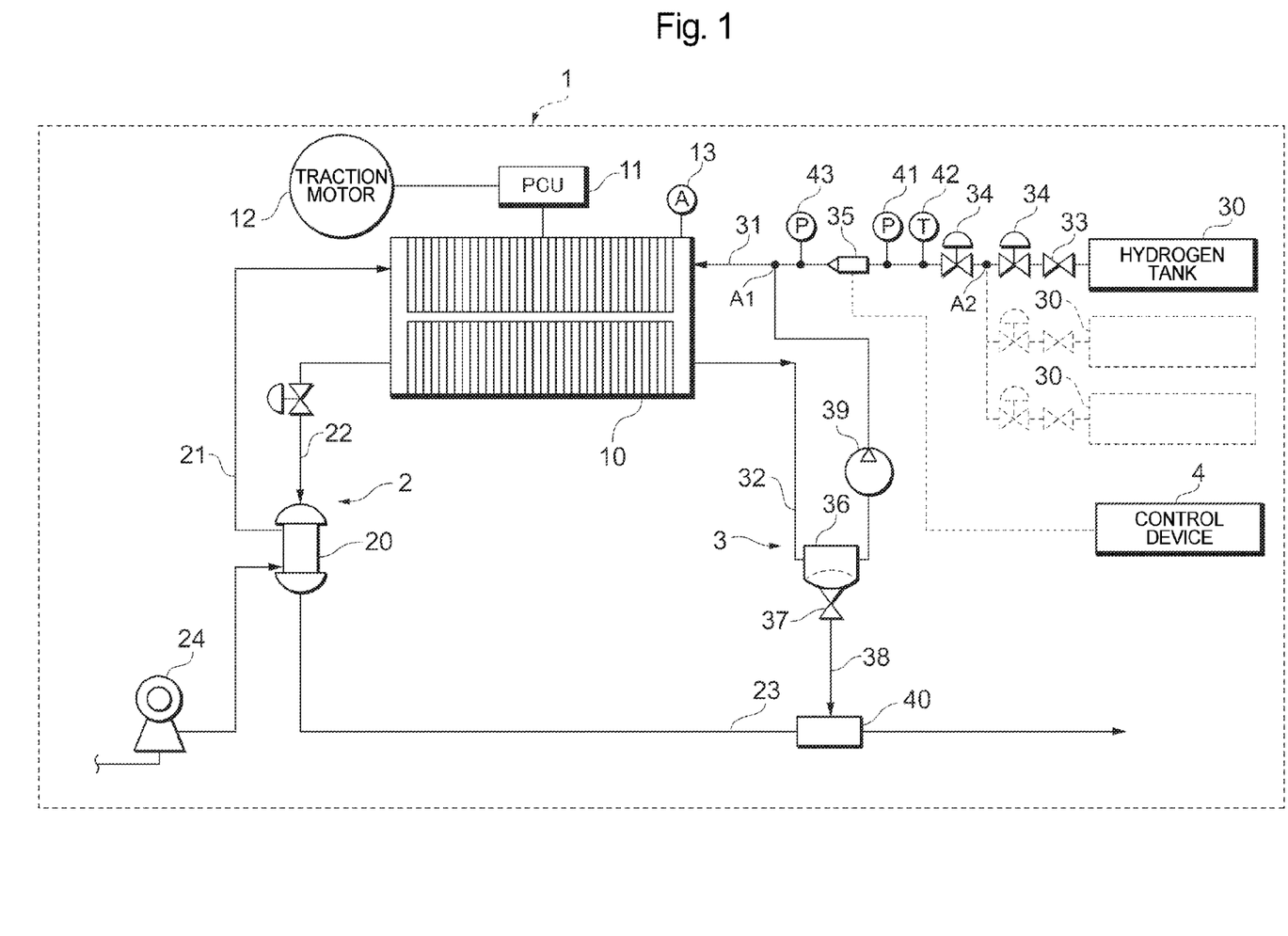
FIG. 1 is a constitution diagram of a fuel cell system according to an embodiment of the present invention.

First, a constitution of the fuel cell system 1 according to the embodiment of the present invention will be described with reference to FIGS. 1 to 3D. As shown in FIG. 1, the fuel cell system 1 according to the present embodiment includes a fuel cell 10 which receives a supplied reactant gas (an oxidizing gas and a fuel gas) to generate a power, and also includes an oxidizing gas piping system 2 which supplies air as the oxidizing gas to the fuel cell 10, a hydrogen gas piping system 3 which supplies a hydrogen gas as the fuel gas to the fuel cell 10, a control device 4 which integrally controls the whole system and the like.

The fuel cell 10 has a stack structure in which the required number of unitary cells for receiving the supplied reactant gas to generate the power are stacked. The power generated by the fuel cell 10 is supplied to a power control unit (PCU) 11. The PCU 11 includes an inverter, a DC-DC converter and the like disposed between the fuel cell 10 and a traction motor 12. Moreover, a current sensor 13 for detecting a current during the power generation is attached to the fuel cell 10.

The oxidizing gas piping system 2 includes an air supply passage 21 which supplies the oxidizing gas (the air) humidified by a humidifier 20 to the fuel cell 10, an air discharge passage 22 which guides an oxidizing off gas discharged from the fuel cell 10 to the humidifier 20, and an exhaust passage 23 which guides the oxidizing off gas externally from the humidifier 20. The air supply passage 21 is provided with a compressor 24 which takes the oxidizing gas from the atmosphere to forward the gas under pressure to the humidifier 20.

The hydrogen gas piping system 3 includes a hydrogen tank 30 as a fuel supply source in which the hydrogen gas having a high pressure is received, a hydrogen supply passage 31 as a fuel supply passage which supplies the hydrogen gas from the hydrogen tank 30 to the fuel cell 10, and a circulation passage 32 which returns a hydrogen off gas discharged from the fuel cell 10 to the hydrogen supply passage 31. It is to be noted that instead of the hydrogen tank 30, a reformer which forms a reformed hydrogen-rich gas from a hydrocarbon based fuel, and a high pressure gas tank which brings the reformed gas formed by this reformer into a high pressure state to accumulate the pressure may be employed as the fuel supply source. Moreover, a tank having a hydrogen occluded alloy may be employed as the fuel supply source.

The hydrogen supply passage 31 is provided with a shut valve 33 which shuts or allows the supply of the hydrogen gas from the hydrogen tank 30, a regulator 34 which regulates the pressure of the hydrogen gas, and an injector 35. Moreover, the upstream side of the injector 35 is provided with a primary pressure sensor 41 and a temperature sensor 42 for detecting the pressure and temperature of the hydrogen gas in the hydrogen supply passage 31. Furthermore, on the downstream side of the injector 35 and the upstream side of a joining part A1 between the hydrogen supply passage 31 and the circulation passage 32, a secondary pressure sensor 43 for detecting the pressure of the hydrogen gas in the hydrogen supply passage 31 is provided. The secondary pressure sensor 43 corresponds to one embodiment of a sensor or a pressure sensor in the present invention.

The regulator 34 is a device which regulates the upstream pressure (the primary pressure) of the regulator into a preset secondary pressure. In the present embodiment, a mechanical pressure reduction valve for decreasing the primary pressure is employed as the regulator 34. As a constitution of the mechanical pressure reduction valve, a known constitution can be employed which has a housing provided with a back pressure chamber and a pressure regulation chamber formed via a diaphragm and in which the primary pressure is decreased to a predetermined pressure by the back pressure of the back pressure chamber to form the secondary pressure in the pressure regulation chamber. In the present embodiment, as shown in FIG. 1, two regulators 34 are disposed on the upstream side of the injector 35, whereby the upstream pressure of the injector 35 can effectively be decreased. Therefore, it is possible to increase the degree of freedom in the design of the mechanical structure (the valve body, the housing, a passage, a driving device, etc.) of the injector 35. Moreover, since the upstream pressure of the injector 35 can be decreased, it is possible to suppress a situation in which the valve body of the injector 35 does not easily move owing to the increase of a difference between the upstream pressure of the injector 35 and the downstream pressure of the injector. Therefore, the variable pressure regulation width of the downstream pressure of the injector 35 can be increased, and the deterioration of the response of the injector 35 can be suppressed.

The injector 35 is an electromagnetic driving type on/off valve in which a valve body is directly driven with an electromagnetic driving force for a predetermined drive cycle and detached from a valve seat, whereby a gas flow rate or a gas pressure can be regulated. The injector 35 includes the valve seat having a jet hole which jets a gas fuel such as the hydrogen gas, and also includes a nozzle body which supplies and guides the gas fuel to the jet hole, and the valve body movably received and held in an axial direction (a gas flow direction) with respect to the nozzle body to open or close the jet hole. In the present embodiment, the valve body of the injector 35 is driven by a solenoid which is an electromagnetic driving device, and a pulse-like excitation current supplied to the solenoid is turned on/off, whereby the opening areas of the jet hole can be switched to two or multiple stages. When the gas jet time and gas jet timing of the injector 35 are controlled in accordance with a control signal output from the control device 4, the flow rate and pressure of the hydrogen gas are precisely controlled. The injector 35 directly drives the valve (the valve body and the valve seat) to open or close the valve with the electromagnetic driving force, the drive cycle of the injector can be controlled to a high response region, and hence the injector has a high response.

For the purpose of supplying the gas to the downstream side of the injector 35 at a demanded flow rate, the injector 35 changes at least one of the opening area (open degree) and opening time of the valve body provided in the gas passage of the injector 35, to regulate the flow rate (or a hydrogen molar concentration) of the gas which is supplied to the downstream side (a fuel cell 10 side). It is to be noted that the valve body of the injector 35 is opened or closed to regulate the gas flow rate, the pressure of the gas to be supplied to the downstream side of the injector 35 is decreased as compared with the pressure of the gas on the upstream side of the injector 35, and hence the injector 35 can be considered as a pressure regulation valve (a pressure reduction valve, a regulator). Moreover, in the present embodiment, the injector can be considered as a variable pressure regulation valve capable of changing the pressure regulation amount (the pressure reduction amount) of the upstream gas pressure of the injector 35 so that the pressure matches a demanded pressure in a predetermined pressure range in accordance with a gas demand.

It is to be noted that in the present embodiment, as shown in FIG. 1, the injector 35 is disposed on the upstream side of the joining part A1 between the hydrogen supply passage 31 and the circulation passage 32. Moreover, as shown by a broken line in FIG. 1, when a plurality of hydrogen tanks 30 are employed as the fuel supply source, the injector 35 is disposed on the downstream side of a part (a hydrogen gas joining part A2) where the hydrogen gases supplied from the respective hydrogen tanks 30 join one another.

The circulation passage 32 is connected to a discharge passage 38 through a gas-liquid separator 36 and a gas/water discharge valve 37. The gas-liquid separator 36 collects water from the hydrogen off gas. The gas/water discharge valve 37 operates in accordance with a command from the control device 4, to discharge (purge), to the outside, the water collected by the gas-liquid separator 36 and the hydrogen off gas (a fuel off gas) including impurities in the circulation passage 32. Moreover, the circulation passage 32 is provided with a hydrogen pump 39 which pressurizes the hydrogen off gas in the circulation passage 32 to forward the gas to a hydrogen supply passage 31 side. It is to be noted that the hydrogen off gas discharged through the gas/water discharge valve 37 and the discharge passage 38 joins the oxidizing off gas in the exhaust passage 23, and is diluted by a diluter 40.

The control device 4 detects the operation amount of an accelerating operation member (an accelerator or the like) provided in the vehicle, and receives control information such as a demanded acceleration value (e.g., a demanded power generation amount from a load device such as the traction motor 12), to control the operations of various devices in the system. It is to be noted that the load device generically refers to a power consumption device, and examples of the device include, in addition to the traction motor 12, auxiliary devices (e.g., motors of the compressor 24, the hydrogen pump 39 and a cooling pump, etc.) necessary for operating the fuel cell 10, actuators for use in various devices (a change gear, a wheel control device, a steering device, a suspension device, etc.) concerned with the running of the vehicle, and an air conditioning device (an air conditioner), illumination, audio and the like for a passenger space.

The control device 4 is constituted of a computer system (not shown). Such a computer system includes a CPU, an ROM, an RAM, an HDD, an input/output interface, a display and the like, and the CPU reads and executes various control programs recorded in the ROM, to realize various control operations.

Figure 2:
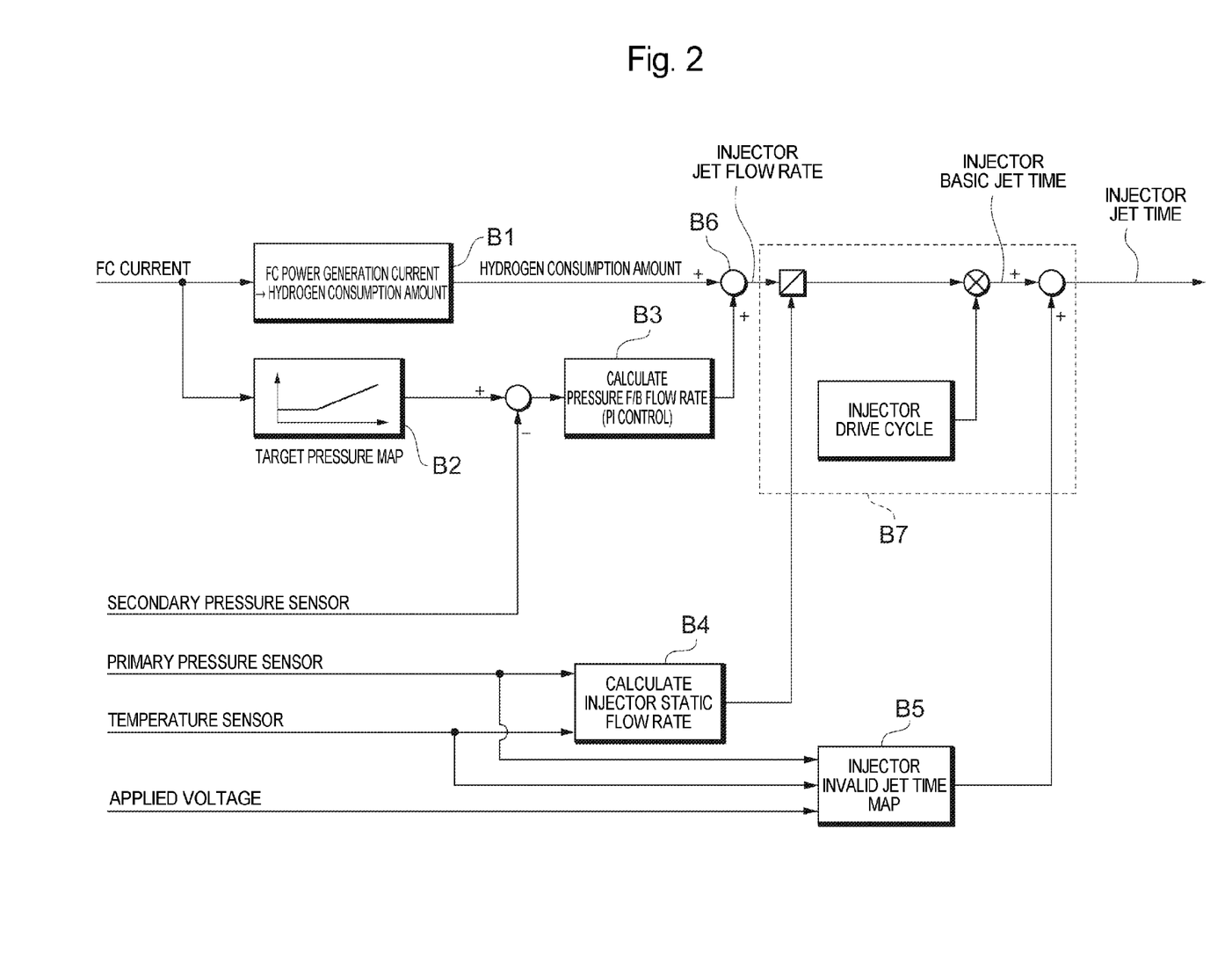
FIG. 2 is a control block diagram for explaining the control configuration of a control device of the fuel cell system shown in FIG. 1.

Specifically, as shown in FIG. 2, the control device 4 calculates the amount (hereinafter referred to as "the hydrogen consumption amount") of the hydrogen gas to be consumed by the fuel cell 10 based on the operation state of the fuel cell 10 (the value of the current detected by the current sensor 13 during the power generation of the fuel cell 10) (a fuel consumption amount calculating function: B1). In the present embodiment, the hydrogen consumption amount is calculated and updated for each calculation cycle of the control device 4 by use of a specific calculation formula indicating a relation between the current value and the hydrogen consumption amount in the fuel cell 10.

Moreover, the control device 4 calculates the target pressure value (the target pressure of the gas to be supplied to the fuel cell 10) of the hydrogen gas in the downstream position of the injector 35 based on the operation state of the fuel cell 10 (the value of the current detected by the current sensor 13 during the power generation of the fuel cell 10) (a target pressure value calculating function: B2). In the present embodiment, the target pressure value in a position where the secondary pressure sensor 43 is disposed is calculated and updated for each calculation cycle of the control device 4 by use of a specific map indicating a relation between the power generation current value and the target pressure value in the fuel cell 10.

Furthermore, the control device 4 calculates a feedback correction flow rate based on a difference between the calculated target pressure value and the detected pressure value of the downstream position of the injector 35 detected by the secondary pressure sensor 43 (a feedback correction flow rate calculating function: B3). The feedback correction flow rate is a hydrogen gas flow rate to be added to the hydrogen consumption amount to decrease the difference between the target pressure value and the detected pressure value. In the present embodiment, the feedback correction flow rate is calculated and updated for each calculation cycle of the control device 4 by use of a PI type feedback control rule.

In addition, the control device 4 calculates a static flow rate on the upstream side of the injector 35 based on the upstream gas state of the injector 35 (the pressure of the hydrogen gas detected by the primary pressure sensor 41 and the temperature of the hydrogen gas detected by the temperature sensor 42) (a static flow rate calculating function: B4). In the present embodiment, the static flow rate is calculated and updated for each calculation cycle of the control device 4 by use of a specific calculation formula indicating a relation between the pressure and temperature and the static flow rate of the hydrogen gas on the upstream side of the injector 35.

Moreover, the control device 4 calculates the invalid jet time of the injector 35 based on the upstream gas state of the injector 35 (the pressure and temperature of the hydrogen gas) and an applied voltage (an invalid jet time calculating function: B5). Here, the invalid jet time is a time necessary from a time when the injector 35 receives the control signal from the control device 4 to a time when the injector actually starts jetting. In the present embodiment, the invalid jet time is calculated and updated for each calculation cycle of the control device 4 by use of a specific map indicating a relation among the pressure and temperature of the hydrogen gas on the upstream side of the injector 35, the applied voltage and the invalid jet time.

Furthermore, the control device 4 adds up the hydrogen consumption amount and the feedback correction flow rate to calculate the jet flow rate of the injector 35 (a jet flow rate calculating function: B6). Then, the control device 4 multiplies, by the drive cycle of the injector 35, a value obtained by dividing the jet flow rate of the injector 35 by the static flow rate, to calculate the basic jet time of the injector 35, and the control device adds up this basic jet time and the invalid jet time to calculate the total jet time of the injector 35 (a total jet time calculating function: B7). Here, the drive cycle is a period having a stepped (on/off) waveform indicating the opening/closing state of the jet hole of the injector 35. In the present embodiment, the control device 4 sets the drive cycle to a constant value.

In addition, the control device 4 sends the control signal for realizing the total jet time of the injector 35 calculated by the above procedure, to control the gas jet time and gas jet timing of the injector 35, thereby regulating the flow rate and pressure of the hydrogen gas to be supplied to the fuel cell 10. In consequence, the control device 4 controls the injector 35 with reference to the detected pressure value of the downstream position of the injector 35 detected by the secondary pressure sensor 43.

Figure 3A:
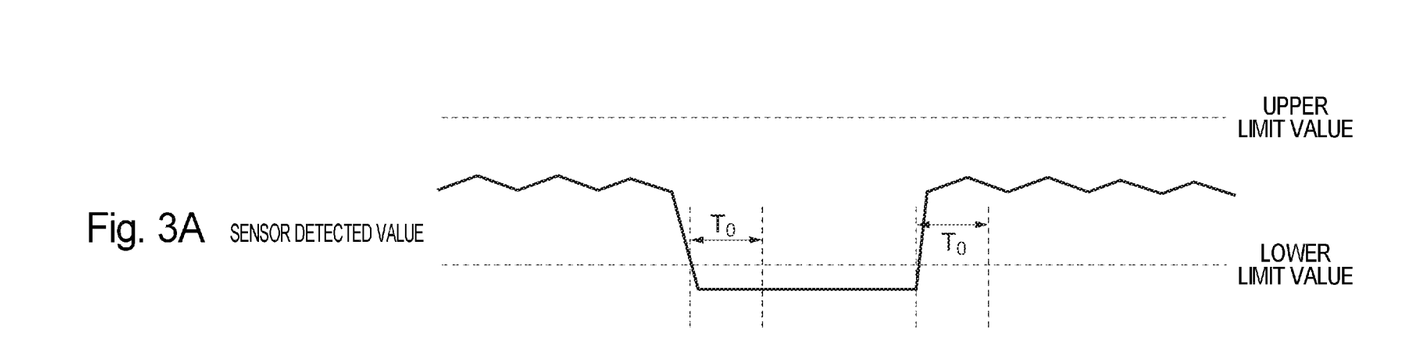
FIG. 3A is a time chart showing the history of a value with an elapse of time, the value being detected by a secondary pressure sensor of the fuel cell system shown in FIG. 1.
Figure 3B:
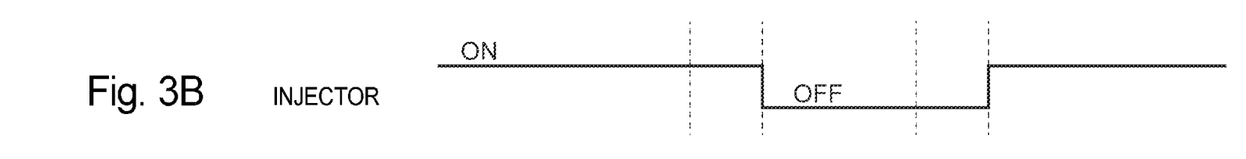
FIG. 3B is a time chart showing one example of the control operation of an injector of the fuel cell system shown in FIG. 1.

Moreover, the control device 4 judges, during the normal operation of the fuel cell 10, whether or not the secondary pressure sensor 43 is abnormal, and stops the jet operation (the opening/closing operation) of the injector 35 to obtain a totally closed state in a case where it is judged that the secondary pressure sensor 43 falls into the abnormal state. Specifically, in a case where the value detected by the secondary pressure sensor 43 is below a predetermined lower limit value or above a predetermined upper limit value and this state continues for a predetermined time $T_0$, as shown in FIG. 3A, the control device 4 judges that the secondary pressure sensor 43 falls into the abnormal state and as shown in FIG. 3B, the control device brings the injector 35 into the totally closed state. That is, the control device 4 functions as one embodiment of control means in the present invention.

Figures 3C, 3D:
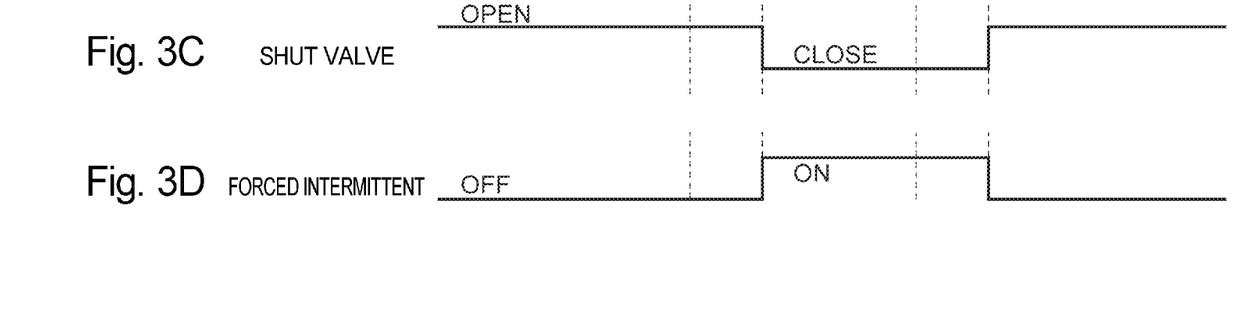
FIG. 3C is a time chart showing one example of the control operation of a shut valve of the fuel cell system shown in FIG. 1.
FIG. 3D is a time chart showing one example of the forced intermittent operation of the fuel cell system shown in FIG. 1.

Furthermore, in a case where the control device 4 judges that the secondary pressure sensor 43 falls into the abnormal state, as shown in FIG. 3C, the control device closes the shut valve 33 provided in the hydrogen supply passage 31 to shut the supply of the hydrogen gas from the hydrogen tank 30. In consequence, the upstream pressure of the injector 35 can be prevented from excessively rising. Moreover, in a case where the control device 4 judges that the secondary pressure sensor 43 falls into the abnormal state, as shown in FIG. 3D, the control device closes the gas/water discharge valve 37 provided in the circulation passage 32, stops the hydrogen pump 39 and the compressor 24, shifts from the normal operation to a forced intermittent operation, and temporarily stops the power generation.

On the other hand, the control device 4 judges, during the above forced intermittent operation, whether or not the secondary pressure sensor 43 recovers, and the control device re-operates the injector 35 in a case where it is judged that the secondary pressure sensor 43 recovers from the abnormal state to a normal state. Specifically, in a case where as shown in FIG. 3A, the value detected by the secondary pressure sensor 43 is a predetermined lower limit value or more and a predetermined upper limit value or less and this state continues for the predetermined time $T_0$, the control device 4 judges that the secondary pressure sensor 43 recovers from the abnormal state to the normal state, and as shown in FIG. 3B, the control device restarts the jet operation (the opening/closing operation) of the injector 35.

Moreover, in a case where the control device 4 judges that the secondary pressure sensor 43 recovers from the abnormal state to the normal state, as shown in FIG. 3C, the control device opens the closed shut valve 33, to restart the supply of the hydrogen gas from the hydrogen tank 30. Furthermore, in a case where the control device 4 judges that the secondary pressure sensor 43 recovers from the abnormal state to the normal state, as shown in FIG. 3D, the control device opens the gas/water discharge valve 37 provided in the circulation passage 32, operates the hydrogen pump 39 and the compressor 24, shifts from the forced intermittent operation to the normal operation, and restarts the power generation.

Figure 4:
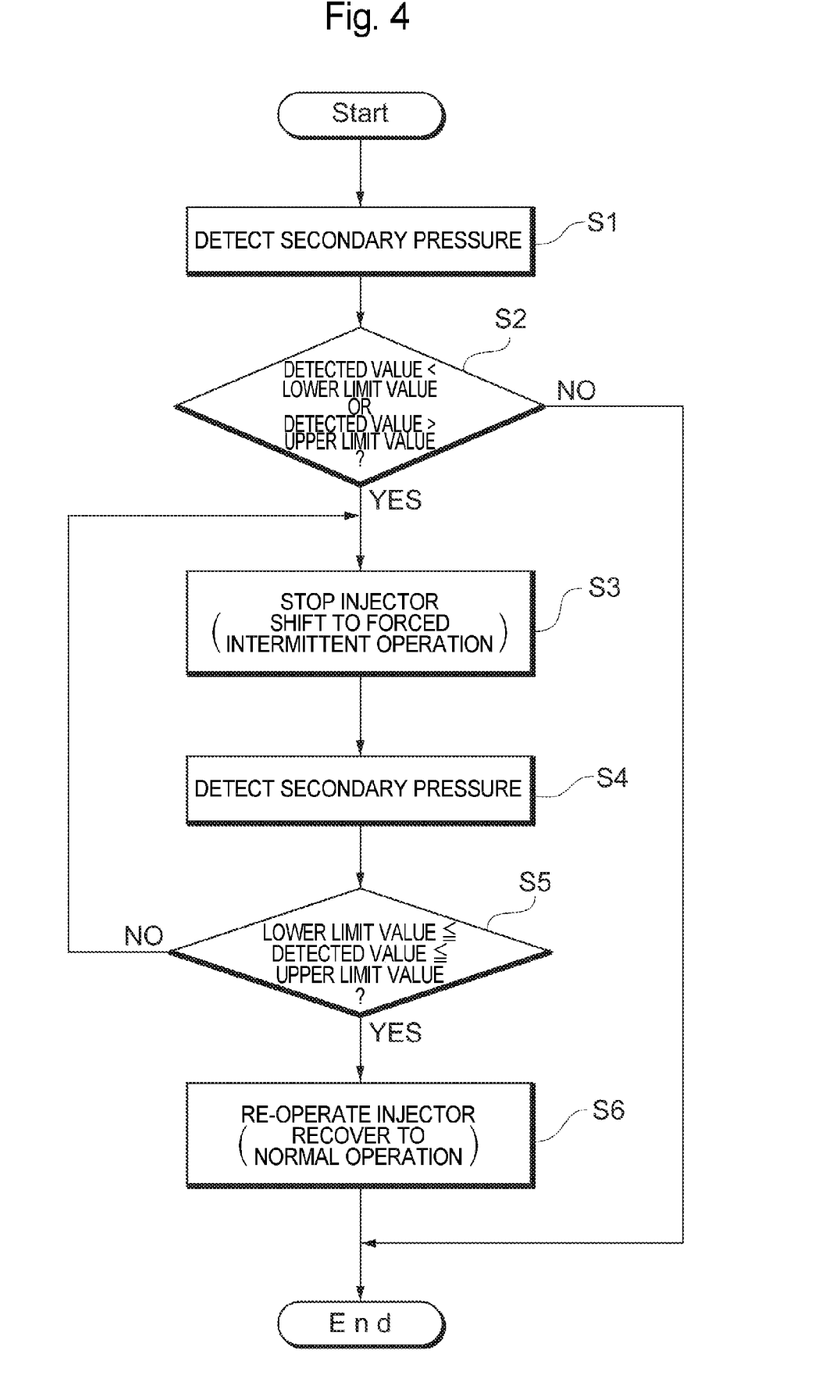
FIG. 4 is a flow chart for explaining the operation method of the fuel cell system shown in FIG. 1.

Next, an operation method of the fuel cell system 1 according to the present embodiment will be described with reference to the flow chart of FIG. 4.

During the normal operation of the fuel cell system 1, the hydrogen gas is supplied from the hydrogen tank 30 to a fuel pole of the fuel cell 10 through the hydrogen supply passage 31, and the humidified and regulated air is supplied to an oxidizing pole of the fuel cell 10 through the air supply passage 21, thereby generating the power. In this case, the power to be discharged from the fuel cell 10 (the demanded power) is calculated by the control device 4, and the injector 35 or the compressor 24 is driven and controlled to supply, into the fuel cell 10, the hydrogen gas and air corresponding to the power generation amount. In the present embodiment, when the secondary pressure sensor 43 falls into the abnormal state during such a normal operation, the jet operation of the injector 35 is stopped, and shifted to the forced intermittent operation, whereby the power generation is temporarily stopped.

First, the control device 4 of the fuel cell system 1 detects the pressure value of the hydrogen gas on the downstream side of the injector 35 by use of the secondary pressure sensor 43 (a normal time pressure detection step: S1). Then, the control device 4 judges whether or not the detected value in the normal time pressure detection step S1 is below a predetermined lower limit value or above a predetermined upper limit value and whether or not this state continues for the predetermined time $T_0$ (an abnormality judgment step: S2).

In a case where in the abnormality judgment step S2, the control device 4 judges that the detected value of the secondary pressure sensor 43 is the predetermined lower limit value or more and the predetermined upper limit value or less or the control device judges that the detected value of the secondary pressure sensor 43 is below the predetermined lower limit value or above the predetermined upper limit value but the state does not continue for the predetermined time $T_0$, the control device judges that the secondary pressure sensor 43 is normal, and ends a control operation as it is.

On the other hand, in a case where in the abnormality judgment step S2, the control device 4 judges that the detected value of the secondary pressure sensor 43 is below the predetermined lower limit value or above the predetermined upper limit value and that the state continues for the predetermined time $T_0$, the control device judges that the secondary pressure sensor 43 falls into the abnormal state, and stops the jet operation of the injector 35 to obtain the totally closed state (an injector stop step: S3). It is to be noted that when the injector 35 stops, the control device 4 closes the shut valve 33 provided in the hydrogen supply passage 31 and the gas/water discharge valve 37 provided in the circulation passage 32, stops the hydrogen pump 39 and the compressor 24, shifts from the normal operation to the forced intermittent operation, and temporarily stops the power generation.

Subsequently, while the forced intermittent operation is performed through the injector stop step S3, the control device 4 detects the pressure value of the hydrogen gas on the downstream side of the injector 35 by use of the secondary pressure sensor 43 (an intermittent time pressure detection step: S4), and the control device judges whether or not the detected value is the predetermined lower limit value or more and the predetermined upper limit value or less and whether or not the state continues for the predetermined time $T_0$ (a recovery judgment step: S5).

In a case where in the recovery judgment step S5, the control device 4 judges that the detected value of the secondary pressure sensor 43 is below the predetermined lower limit value or above the predetermined upper limit value or the control device judges that the detected value of the secondary pressure sensor 43 is the predetermined lower limit value or more and the predetermined upper limit value or less but the state does not continue for the predetermined time $T_0$, the control device judges that the secondary pressure sensor 43 is still in the abnormal state, and returns to the injector stop step S3 to continue the control.

On the other hand, in a case where in the abnormality judgment step S2, the control device 4 judges that the detected value of the secondary pressure sensor 43 is the predetermined lower limit value or more and the predetermined upper limit value or less and that the state continues for the predetermined time $T_0$, the control device judges that the secondary pressure sensor 43 recovers from the abnormal state to the normal state, and restarts the jet operation of the injector 35 (an injector re-operation step: S6). It is to be noted that when the injector 35 re-operates, the control device 4 opens the closed shut valve 33 and gas/water discharge valve 37, re-operates the hydrogen pump 39 and compressor 24, shifts from the forced intermittent operation to the normal operation and restarts the power generation.

In the fuel cell system 1 according to the above embodiment, it is possible to prevent the supply state of the hydrogen gas to the fuel cell 10 from being abnormal owing to the wrong operation of the injector 35 caused by the abnormality of the secondary pressure sensor 43. Therefore, the power generation state of the fuel cell 10 can be prevented from being abnormal, and it is possible to avoid a situation in which the constituent components in the fuel cell 10 deteriorate owing to the immediate increase of the amount of the fuel to be supplied to the fuel cell 10.

Moreover, in the fuel cell system 1 according to the above embodiment, the shut valve 33 on the upstream side of the injector 35 can be closed owing to the abnormality of the secondary pressure sensor 43, and hence the pressure of the hydrogen gas on the upstream side of the injector 35 can be prevented from excessively rising. Therefore, the breakdown of the injector 35 can be suppressed.

Furthermore, in the fuel cell system 1 according to the above embodiment, when the secondary pressure sensor 43 recovers from the abnormal state to the normal state, the opening/closing operation of the injector 35 can automatically be restarted, and the supply of the fuel to the fuel cell 10 can be restarted. Therefore, when the secondary pressure sensor 43 recovers from the abnormal state to the normal state, the power generation of the fuel cell 10 can automatically be restarted.

Figure 5A:
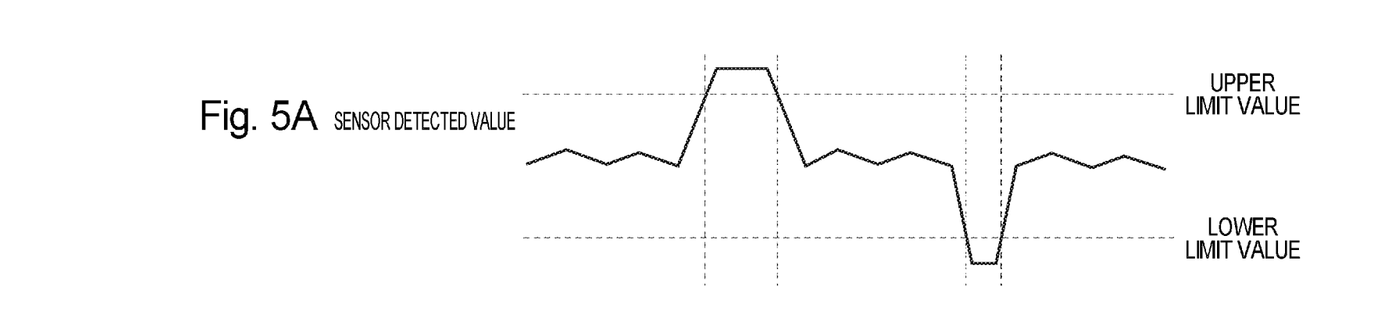
FIG. 5A is a time chart showing the history of the value with the elapse of time, the value being detected by the secondary pressure sensor of the fuel cell system shown in FIG. 1.
Figure 5B:
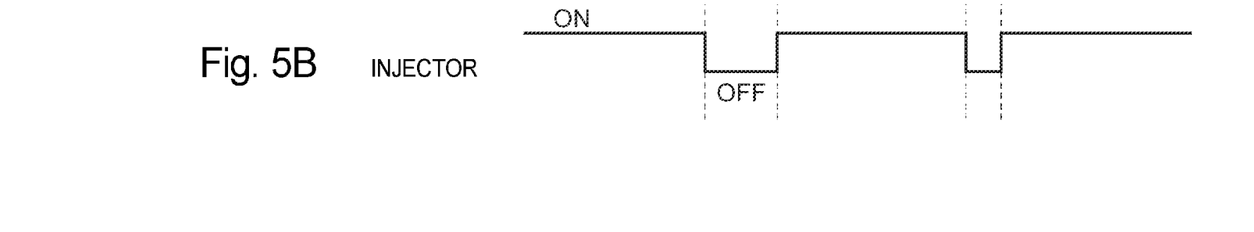
FIG. 5B is a time chart showing another example of the control operation of the injector of the fuel cell system shown in FIG. 1.

It is to be noted that in the above embodiment, an example has been described in which it is judged that the secondary pressure sensor 43 falls into the abnormal state in a case where the detected value of the secondary pressure sensor 43 is below the predetermined lower limit value or above the predetermined upper limit value and the state continues for the predetermined time $T_0$, but a method of abnormality judgment is not limited to this example. For example, in a case where as shown in FIG. 5A, the detected value of the secondary pressure sensor 43 is below the predetermined lower limit value or the detected value of the secondary pressure sensor 43 is above the predetermined upper limit value, it is immediately judged that the secondary pressure sensor 43 falls into the abnormal state, and as shown in FIG. 5B, the injector 35 can be brought into the totally closed state.

Moreover, in the above embodiment, an example has been described in which it is judged that the secondary pressure sensor 43 recovers from the abnormal state to the normal state in a case where the detected value of the secondary pressure sensor 43 is the predetermined lower limit value or more and the predetermined lower limit value or less and the state continues for the predetermined time $T_0$, but a method of the judgment of the recovery from the abnormal state is not limited to this example. For example, in a case where as shown in FIG. 5A, the detected value of the secondary pressure sensor 43 is the predetermined lower limit value or more and the predetermined upper limit value or less, it is immediately judged that the secondary pressure sensor 43 recovers from the abnormal state to the normal state, and as shown in FIG. 5B, the injector 35 can restart the jet operation.

Figure 6:
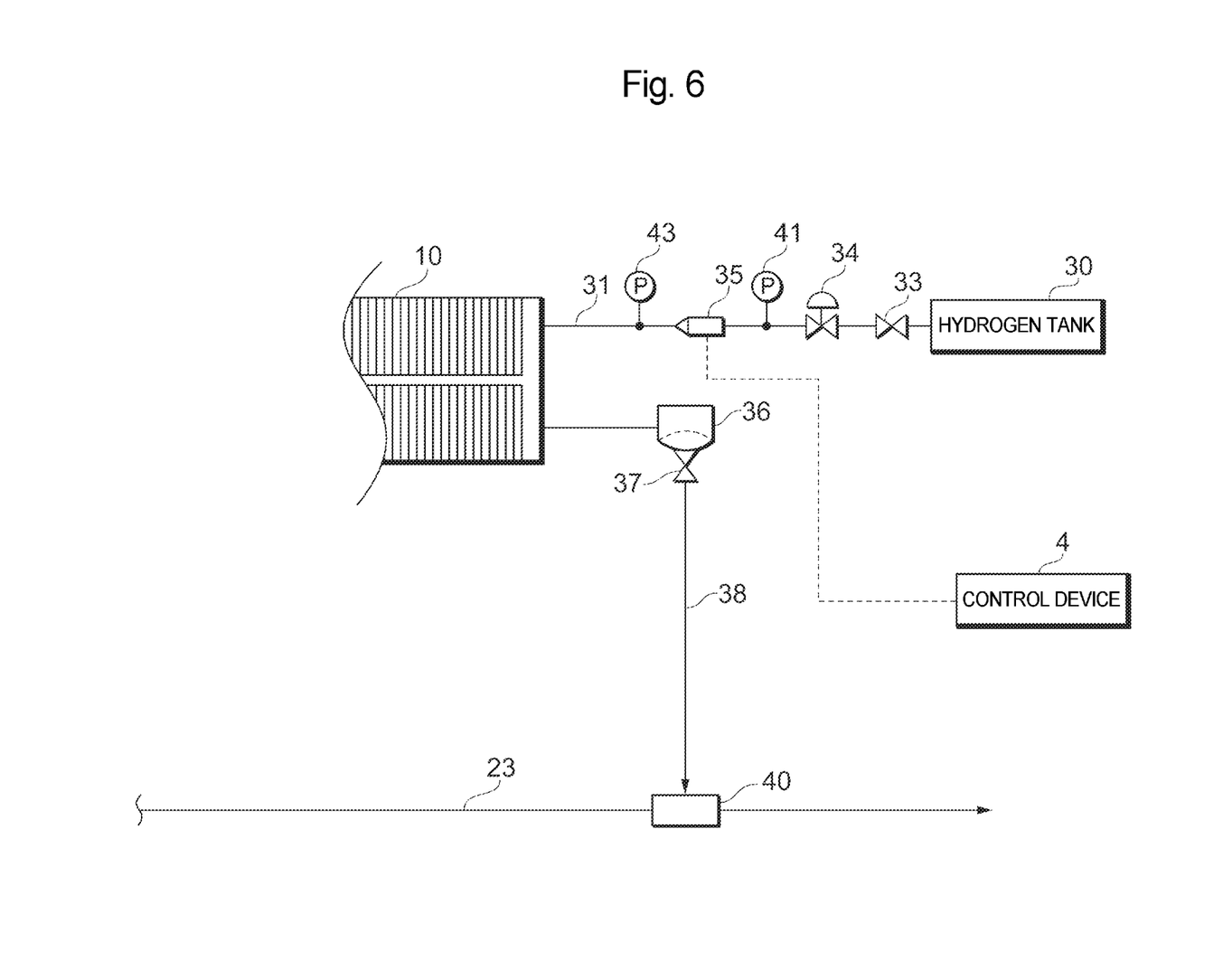
FIG. 6 is a constitution diagram showing a modification of the fuel cell system shown in FIG. 1.

Furthermore, in the above embodiment, an example has been described in which the hydrogen gas piping system 3 of the fuel cell system 1 is provided with the circulation passage 32, but as shown in, for example, FIG. 6, the fuel cell 10 may directly be connected to the discharge passage 38, and the circulation passage 32 may be omitted. Even in a case where such a constitution (a dead end system) is employed, when in the same manner as in the above embodiment, the control device 4 judges the abnormality of the secondary pressure sensor 43 and the secondary pressure sensor 43 falls into the abnormal state, the injector 35 may be brought into the totally closed state.

Additionally, in the above embodiment, an example has been described in which the injector 35 is employed as the on/off valve of the present invention, but the on/off valve is not limited to the injector 35 as long as the gas state on the upstream side of the supply passage (the hydrogen supply passage 31) is regulated to supply the gas to the downstream side thereof.

Moreover, in the above embodiment, an example has been described in which the secondary pressure sensor 43 is disposed in the downstream position of the injector 35 of the hydrogen supply passage 31 and the injector 35 is controlled to regulate the pressure in this position (bring the pressure close to a predetermined target pressure value), but the position of the secondary pressure sensor is not limited to this example. The secondary pressure sensor may be disposed in, for example, the vicinity of a hydrogen gas inlet of the fuel cell 10 (on the hydrogen supply passage 31), the vicinity of a hydrogen gas outlet of the fuel cell 10 (on the circulation passage 32) or the vicinity of an outlet of the hydrogen pump 39 (on the circulation passage 32). In such a case, a map is prepared in which the target pressure values in the respective positions of the secondary pressure sensor are recorded, and the feedback correction flow rate is calculated based on this map.

Furthermore, in the above embodiment, an example has been described in which the hydrogen supply passage 31 is provided with the shut valve 33 and the regulator 34, but the injector 35 performs not only the function of a variable pressure regulation valve but also the function of a shut valve which shuts the supply of the hydrogen gas, and hence the shut valve 33 or the regulator 34 does not necessarily have to be provided. Therefore, when the injector 35 is employed, the shut valve 33 or the regulator 34 can be omitted, which can realize the miniaturization and cost reduction of the system.

INDUSTRIAL APPLICABILITY

As described in the above embodiment, a fuel cell system according to the present invention can be mounted in a fuel cell vehicle, and can be mounted in various mobile bodies (a robot, a ship, an airplane, etc.) other than the fuel cell vehicle. Moreover, the fuel cell system according to the present invention may be applied to a stational power generation system for use as a power generation facility for a construction (a housing, a building or the like).

The invention claimed is:

1. A fuel cell system comprising:
   a fuel cell;
   a fuel supply passage through which a fuel gas supplied from a fuel supply source flows to the fuel cell;
   an injector which regulates the state of the gas on the upstream side of the fuel supply passage to supply the gas to the downstream side thereof, the injector is an electromagnetic injector and includes a valve seat including a jet opening for jetting the fuel gas;
   a sensor which detects the state of the gas in the fuel supply passage located downstream of the injector;
   a control device programmed to control the injector based on a value detected by the sensor; and
   a shut valve provided on the upstream side of the injector and configured to shut the fuel gas supplied from the fuel supply source,
   wherein the control device is further programmed to bring the injector into the totally closed state, close the shut valve, close a gas/water discharge valve provided in a circulation passage, stop a hydrogen pump that pressurizes a fuel off gas in the circulation passage to forward the gas to the fuel supply passage, stop a compressor that supplies an oxidizing gas to the fuel cell, and shift from a normal operation to a forced intermittent operation to temporarily stop power generation, when the sensor falls into an abnormal state, and
   wherein the control device is programmed to judge whether or not the sensor recovers during the forced intermittent operation and to re-operate the injector in a case where it is judged that the sensor recovers from the abnormal state to a normal state.

2. The fuel cell system according to claim 1, wherein the control device judges that the sensor falls into the abnormal state in a case where the detected value of the sensor is below a predetermined lower limit value or above a predetermined upper limit value.

3. The fuel cell system according to claim 1, wherein the control device judges that the sensor falls into the abnormal state in a case where the detected value of the sensor is below the predetermined lower limit value or above the predetermined upper limit value and this state continues for a predetermined time.

4. The fuel cell system according to claim 1, wherein the control device restarts the opening/closing operation of the injector when the sensor recovers from the abnormal state to a normal state.

5. The fuel cell system according to claim 4, wherein the control device judges that the sensor recovers from the abnormal state to the normal state in a case where the detected value of the sensor judged to be abnormal is the predetermined lower limit value or more and the predetermined upper limit value or less.

6. The fuel cell system according to claim 4, wherein the control device judges that the sensor recovers from the abnormal state to the normal state in a case where the detected value of the sensor judged to be abnormal is the predetermined lower limit value or more and the predetermined upper limit value or less and this state continues for a predetermined time.

7. The fuel cell system according to claim 1, wherein the sensor is a pressure sensor which detects the pressure of the fuel gas on the downstream side of the injector.

8. The fuel cell system according to claim 1, wherein the fuel supply source is a pressurized hydrogen tank.

9. The fuel cell system according to claim 1, wherein the injector valve body is driven by a solenoid which is an electromagnetic driving device, and a pulse-like excitation current supplied to the solenoid is turned on/off.

10. The fuel cell system according to claim 1, wherein the injector directly drives the valve body and valve seat to open or close the valve with an electromagnetic driving force.

* * * * *